(12) United States Patent
Kuno et al.

(10) Patent No.: US 8,799,604 B2
(45) Date of Patent: Aug. 5, 2014

(54) DATA STORAGE APPARATUS, INFORMATION PROCESSING APPARATUS, INFORMATION PROCESSING METHOD, AND PROGRAM

(75) Inventors: Hiroshi Kuno, Kanagawa (JP); Takamichi Hayashi, Tokyo (JP); Munetake Ebihara, Kanagawa (JP); Kenjiro Ueda, Kanagawa (JP); Koji Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 13/316,891

(22) Filed: Dec. 12, 2011

(65) Prior Publication Data

US 2012/0173799 A1 Jul. 5, 2012

(30) Foreign Application Priority Data

Dec. 29, 2010 (JP) ................... 2010-294477

(51) Int. Cl.
*G06F 13/28* (2006.01)
(52) U.S. Cl.
USPC .......................................... 711/163; 713/193
(58) Field of Classification Search
USPC ......... 711/163, 193, 181, 154, 189, 103, 115, 711/168
See application file for complete search history.

(56) References Cited

U.S. PATENT DOCUMENTS

| | | | | |
|---|---|---|---|---|
| 6,606,707 B1* | 8/2003 | Hirota et al. | ................... | 713/172 |
| 2004/0078586 A1* | 4/2004 | Sato et al. | ..................... | 713/193 |
| 2004/0123118 A1* | 6/2004 | Dahan et al. | ................... | 713/189 |
| 2005/0120232 A1* | 6/2005 | Hori et al. | ...................... | 713/193 |
| 2006/0075395 A1* | 4/2006 | Lee et al. | ........................ | 717/168 |
| 2006/0262927 A1* | 11/2006 | Rutkowski et al. | ........... | 380/201 |
| 2009/0089593 A1* | 4/2009 | Kuno et al. | .................... | 713/193 |
| 2010/0268953 A1 | 10/2010 | Matsukawa et al. | | |
| 2010/0275036 A1* | 10/2010 | Harada et al. | ................. | 713/189 |
| 2012/0042173 A1* | 2/2012 | Chou et al. | .................... | 713/189 |

FOREIGN PATENT DOCUMENTS

| | | |
|---|---|---|
| EP | 1 050 887 A1 | 11/2000 |
| WO | WO 2010/035449 A1 | 4/2010 |

OTHER PUBLICATIONS

Extended European Search Report issued Mar. 22, 2012, in Patent Application No. 11194617.4.
"Toshiba SD Card Specification", Toshiba Corporation Semiconductor Company, http://www.mikrocontroller.net/attachment/21920/SDHC_SDM04G7B7_08G7B7.pdf, XP 55021803, Dec. 29, 2006, pp. 1-64.
"Content Protection for Recordable Media Specification—SD Memory Card Book Common Part", Content Protection for Recordable Media Specification, XP 2996381, Nov. 26, 2001, pp. 1-36.

* cited by examiner

*Primary Examiner* — Charles Rones
*Assistant Examiner* — Han Doan
(74) *Attorney, Agent, or Firm* — Oblon, Spivak, McClelland, Maier & Neustadt, L.L.P.

(57) ABSTRACT

An information storage apparatus that includes a memory unit, a first controller that reads data from the memory unit, and a second controller included in the memory unit that reads a first identification and outputs the first identification in response to an external instruction, wherein the first identification may only be read by the second controller.

15 Claims, 11 Drawing Sheets

DATA STORAGE APPARATUS, INFORMATION PROCESSING APPARATUS, INFORMATION PROCESSING METHOD, AND PROGRAM

CROSS REFERENCE TO RELATED APPLICATIONS

This application claims the benefit of priority under 35 U.S.C. §119 to Japanese Patent Application JP 2010-294477 filed in the Japan Patent Office on Dec. 29, 2010, the entire content of which is hereby incorporated by reference.

FIELD

The present disclosure relates to a data storage apparatus, an information processing apparatus, an information processing method, and a program, and more particularly, to a data storage apparatus, an information processing apparatus, an information processing method, and a program capable of implementing a configuration of preventing unauthorized use of content.

BACKGROUND

Recently, various media such as a DVD (Digital Versatile Disc), a Blu-ray Disc (registered trademark), or a flash memory have been used as a data recording medium. Particularly, recently, memory cards such as Memory Sticks (registered trademark), SD cards, USB memories in which a flash memory having a large storage capacity is installed have been actively used. A user may record content such as music or movies in these various information recording media (media) and install the information recording medium in a reproducing apparatus (player) to reproduce the content.

In addition, in recent years, the content has been actively distributed through a network, and the form of a process of purchasing the content by the user has been gradually shifted from a process of purchasing a disc where the content is recorded in advance to a process of downloading the content from a server connected to the network.

As specific forms of the content purchasing, besides the process of purchasing the media such as ROM discs, there are the following forms of the content purchasing.

(a) EST (Electric Sell Through) where a user apparatus such as network connectable terminal or PC is used to be connected to a content provision server, so that the content is downloaded.

(b) MoD (Manufacturing on Demand) where a public terminal installed at a convenience store or a public space such as a train station is used to record the content on a medium (memory card or the like) of a user.

In this manner, if the user has a medium such as a memory card for recording the content, the user may freely select and purchase a variety of content from various content sources such as a content provider and record the content on the medium of the user.

In addition, the processes of EST, MoD, or the like are disclosed in, for example, JP-A-2008-98765.

However, copyrights, distribution rights and the like to a large amount of the content such as music data or image data are reserved by the producer or seller. Therefore, in the case where the content is to be provided to the user, there are predetermined limitations on use. In other words, only a user having a legitimate right to use is permitted to use the content, so that control is generally performed to prevent unregulated use of such unauthorized copying.

As one of the regulations of content use control, there is a CPRM (Content Protection for Recordable Media). For example, this is a control configuration where the content is encrypted and recorded on the data recording media such as a memory card, a verification value based on an ID unique to the medium (media ID) is recorded, a verification process based on the verification value is performed during reading of the content from the media, and the content use control is performed. Herein, with respect to the media IDs, it is assumed that different IDs are separately recorded on the different media.

However, for example, in the current state, it may not be said that the management where different unique IDs are recorded for each memory card such as an SD card is reliably performed.

FIG. 1 illustrates a sequence of manufacturing a general memory card. As illustrated in FIG. 1, the memory card 10 includes a controller unit 11 and a flash memory unit 12.

The controller unit 11 is manufactured by a controller manufacturing company (controller vendor) 20 which manufactures the controllers.

In addition, the flash memory unit 12 is manufactured by a flash memory company (flash memory vendor) 30 which manufactures flash memory units.

In a general process, the parts manufactured by the vendors are assembled in a final process so as to complete the media 10.

The media IDs are frequently recorded under the management of the controller vendor 20 as a manufacturer of the controller unit 11. There is no problem if the recording of the media ID is performed under the proper management on the controller vendor 20 side. However, in the case where the proper management is not provided, for example, a plurality of the media having the same media IDs are mass produced and supplied to the user.

If this problem occurs, it is impossible to perform the content management based on the aforementioned CPRM, that is, the content use control depending on a configuration where the media ID is a value unique to each of the media. As a result, there is the potential for unauthorized use of the content.

SUMMARY

It is desirable to provide a data storage apparatus, an information processing apparatus, an information processing method, and a program capable of implementing stricter content use control in a configuration having the content use control using a media ID.

According to a first exemplary embodiment, the present disclosure is directed to an information storage apparatus, including: a memory unit; a first controller that reads data from the memory unit; and a second controller included in the memory unit that reads a first identification and outputs the first identification in response to an external instruction, wherein the first identification may only be read by the second controller.

According to another exemplary embodiment, the present disclosure is directed to an information storage method performed by an information storage apparatus, the method including: reading, by a first controller of the information storage apparatus, data from a memory unit of the information storage apparatus; reading, by a second controller included in the memory unit, a first identification; and outputting, by the second controller, the first identification in response to an external instruction, wherein the first identification may only be read by the second controller.

According to another exemplary embodiment, the present disclosure is directed to one or more non-tangible computer readable medium including computer program instructions, which when executed by a first controller and a second controller, cause the first and second controllers to perform a method including: reading, by the first controller, data from a memory unit; reading, by the second controller included in the memory unit, a first identification; and outputting, by the second controller, the first identification in response to an external instruction, wherein the first identification may only be read by the second controller.

The other objects, features, and advantages of the embodiments of the present disclosure will be clarified in the detailed description based on the later-described embodiments of the present disclosure or the accompanying drawings. In addition, in the specification, a system denotes a configuration of a logical set of a plurality of apparatuses, and it is not limited to a configuration where the component apparatuses are included in the same case.

DETAILED DESCRIPTION

Hereinafter, a data storage apparatus, an information processing apparatus, an information processing method, and a program according to embodiments of the present disclosure will be described in detail with reference to the drawings. In addition, the description is made in the following order.

1. Example of Configuration of Data Storage Apparatus (Memory Card)
2. Overview of Process of Using Controller ID (CID) and Flash Memory ID (FID)
3. First Embodiment of Verification Value Generating/Recording Process Performed during Content Recording Process
4. Second Embodiment of Verification Value Generating/Recording Process Performed during Content Recording Process
5. Third Embodiment of Verification Value Generating/Recording Process Performed during Content Recording Process
6. Fourth Embodiment of Verification Value Generating/Recording Process Performed during Content Recording Process
7. Content Reproducing Process Sequence
8. Example of Hardware Configuration of Each Apparatus 1. Example of Configuration of Data Storage Apparatus (Memory Card)

Hereinafter, a data storage apparatus, an information processing apparatus, an information processing method, and a program according to embodiments of the present disclosure will be described in detail with reference to the drawings.

First, an example of a configuration of the data storage apparatus (memory card) is described with reference to FIG. 2 and the subsequent figures.

Figure 2:
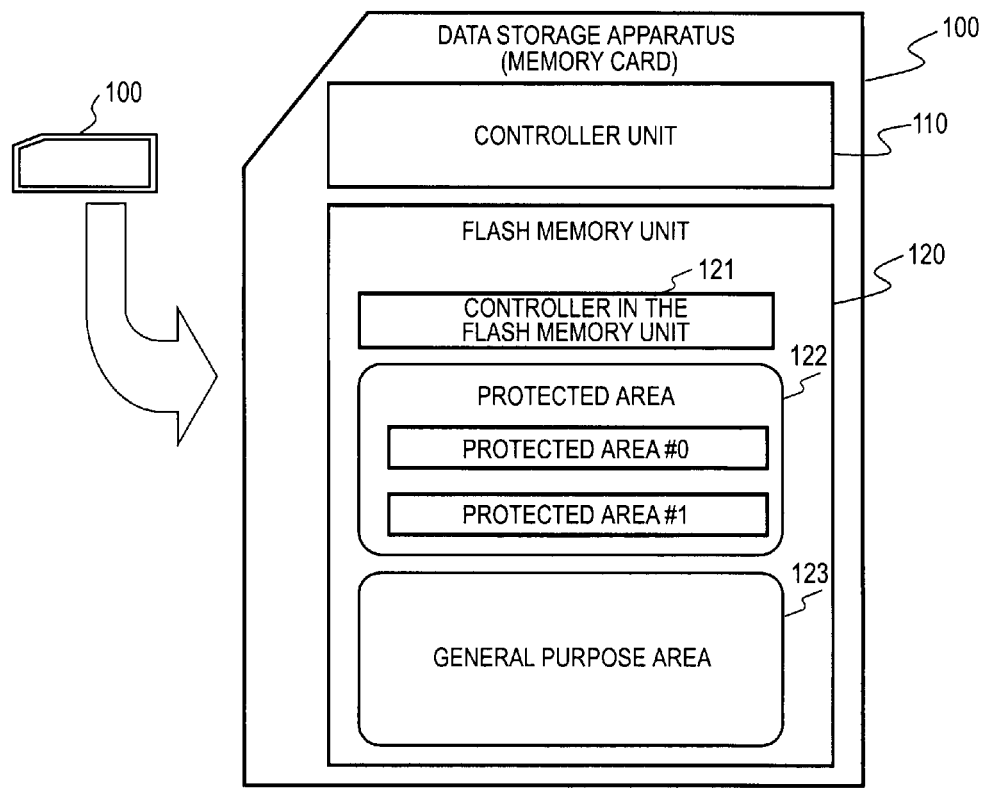
FIG. 2 is a diagram illustrating an example of a configuration of a memory card.

FIG. 2 is a diagram illustrating an example of a configuration of a data storage apparatus (memory card) 100 having a flash memory which is a data storage apparatus which may be adapted to the present disclosure. The data storage apparatus (memory card) 100 is, for example, an SD card, a USB memory, a Memory Stick (registered trademark), or the like.

Figure 1:
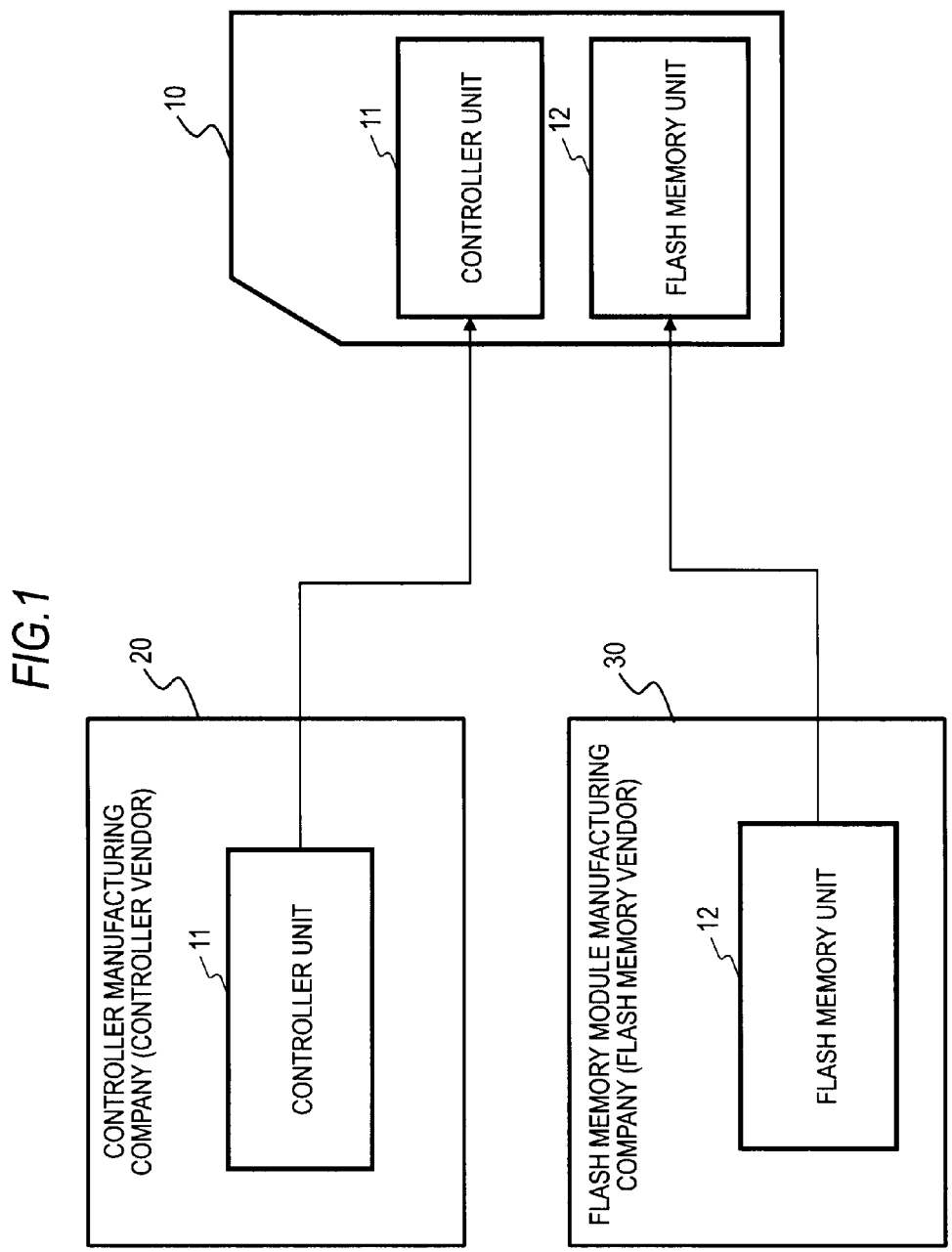
FIG. 1 is a diagram illustrating a manufacturing process of a memory card.

First, as simply described with reference to FIG. 1, the memory card 100 includes a controller unit 110 and a flash memory unit 120.

The controller unit 110 performs data recording and reading control with respect to the flash memory unit 120. In addition, for example, the controller unit 110 performs a control process such as control of communication with the information processing apparatus (host) in which the memory card 100 is installed or control of access to the flash memory unit 120. The controller unit 110 is configured with hardware of a CPU, a RAM, a ROM, and the like.

In addition, the controller unit 110 performs an authentication process with respect to the information processing apparatus (host) in which the memory card 100 is installed, an encryption process of communication data, and the like.

In addition, although described later in detail, the controller unit 110 performs reading a controller ID (CID) which is an ID managed by the controller unit 110.

The flash memory unit 120 includes a data storage area. The flash memory unit 120 further includes a controller in the flash memory unit 121.

As illustrated in this figure, the data storage area is configured with a protected area 122 and a general purpose area 123.

The controller in the flash memory unit 121 performs, for example, a flash memory ID (FID) reading process which is an ID managed by the flash memory unit 120.

For example, first, the controller ID (CID) is an ID which is set under the management of the controller vendor described with reference to FIG. 1, and the flash memory ID (FID) is an ID which is set under the management of the flash memory vendor. In other words, the two IDs are set as IDs which are independently and separately managed.

The controller ID (CID) is considered to be an ID which may be read only by the controller unit 110, and the flash memory ID (FID) is considered to be an ID which may be read only by the controller in the flash memory unit 121.

In addition, the recording areas of the IDs are not particularly limited. For example, the controller ID (CID) may be recorded in a memory inside the controller unit or in a data storage area of the flash memory unit 120. The flash memory ID (FID) is recorded in the data storage area of the flash memory unit 120.

In addition, the protected area 122 which is set as the data storage area of the flash memory unit 120 is an access limited area where only a specific apparatus to which the access right is granted may perform access (data writing or data reading).

The general purpose area 123 is a data recording area where access is not limited.

In addition, the information processing apparatus which is to perform access to the protected area 122 perform a predetermined authentication process with respect to the controller unit 110. For example, it is necessary that a certificate (Cert) where the access right with respect to partitioned area s (Protected Area #0, #1, . . . ) inside the protected area is written is presented to the controller unit 110 so as to obtain confirmation of the controller unit 110.

2. Overview of Process of Using Controller ID (CID) and Flash Memory ID (FID)

Next, an overview of a process of using the controller ID (CID) and the flash memory ID (FID) is described with reference to FIG. 3.

In the configuration of the embodiment of the present disclosure, during the process of recording the data such as content in the memory card 100, a verification value is generated by using the two IDs of the controller ID (CID) and the flash memory ID (FID), and the verification value together with the recording content is recorded on the memory card 100.

In addition, it is configured that, in the case of performing the reading and reproducing process of the content from the memory card 100, the verification process based on the verification value recorded together with the content is performed, and only in the case where the verification process is satisfied, the reading and reproducing process of the content is permitted.

In the configuration of the embodiment of the present disclosure, the verification value using both the controller ID (CID) and the flash memory ID (FID) which are the two independently managed different IDs is configured to be used.

In addition, the process of reading the controller ID (CID) is performed by the controller unit of the memory card 100.

The process of reading the flash ID (FID) is performed by the controller in the flash memory unit.

According to the configuration of using the verification value using the two IDs of the controller ID (CID) and the flash memory ID (FID) which are, for example, although one of the CID and the FID is an ID which is improperly set under improper management, if at least one ID is an correctly managed ID, the content use control according to the ID based on the proper management may be implemented.

Figure 3:
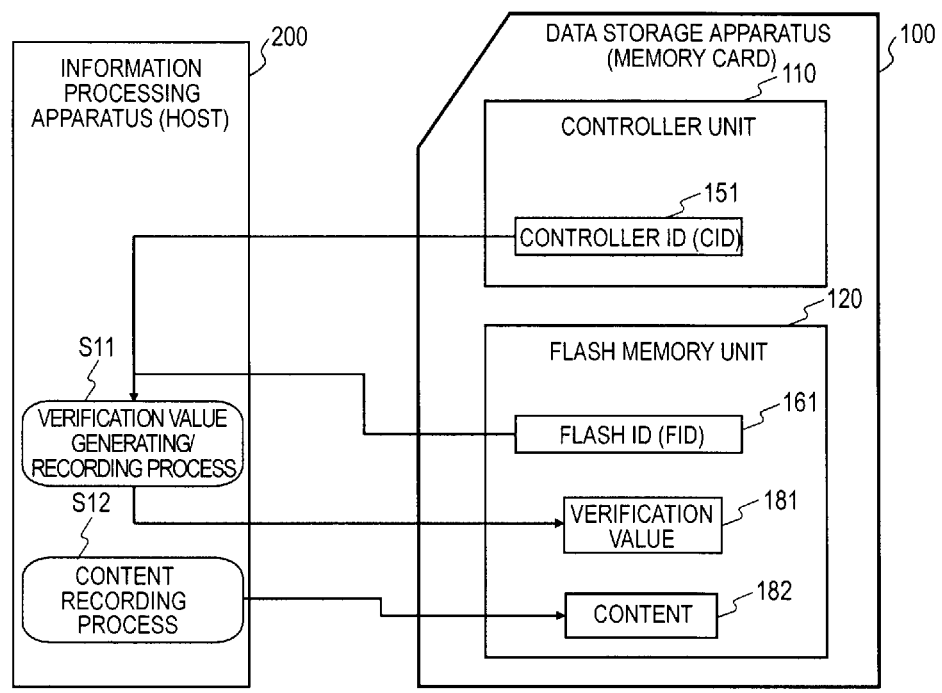
FIG. 3 is a diagram illustrating an overview of a verification value generating/recording process according to an embodiment of the present disclosure.

FIG. 3 is a diagram illustrating an overview of the process sequence performed during the process of recording the content in the data storage apparatus (memory card) 100.

FIG. 3 illustrates a data storage apparatus (memory card) 100 and an information processing apparatus (host) 200 which performs a process of recording the content in the data storage apparatus (memory card) 100.

In addition, the information processing apparatus (host) 200 is, for example, an apparatus such as a PC or a recorder of a user in which the memory card 100 may be installed. Alternatively, the information processing apparatus (host) 200 may be a content provision server or the like, which is connected to a PC of a user or the like through a network.

Before the content recording with respect to the data storage apparatus (memory card) 100, the information processing apparatus (host) 200 reads the controller ID (CID) 151 which is an ID which may be read by the controller unit 110 and the flash memory ID (FID) 161 which is an ID which may be read by the controller of the flash memory unit 120 (the controller in the flash memory unit 121 illustrated in FIG. 2).

In addition, in order to receive the controller ID (CID) 151 from the controller unit 110, the information processing apparatus (host) 200 performs a mutual authentication process, which is regulated in advance, between the information processing apparatus (host) 200 and the controller unit 110 and performs a process of checking whether or not the authentication process is satisfied, and the two apparatuses trust each other. In other words, the information processing apparatus (host) 200 receives the controller ID (CID) 151 from the controller unit 110 on the condition that the mutual authentication is satisfied.

Similarly, it is preferably configured that, in the case where the flash memory ID (FID) 161 is received by the controller of the flash memory unit 120 (the controller in the flash memory unit 121), the information processing apparatus (host) 200 performs a mutual authentication process, which is regulated in advance, between the information processing apparatus (host) 200 and the controller in the flash memory unit 121 and receives the flash memory ID (FID) 161 from the controller unit 110 on the condition that the mutual authentication is satisfied.

However, in the case where the controller in the flash memory unit 121 does not have an authentication process function, the authentication process may be omitted.

However, the flash memory ID (FID) 161 is the data which may be read by the controller in the flash memory unit 121, and the flash memory ID (FID) 161 may be directly read by the controller unit 110 without the controller in the flash memory unit 121. For example, the flash memory ID (FID) is recorded in a storage area of a specific address, which may be used only by the controller in the flash memory unit 121.

In this manner, before the content recording with respect to the data storage apparatus (memory card) 100, the information processing apparatus (host) 200 reads the controller ID (CID) 151 which is an ID which may be read by the controller unit 110 and the flash memory ID (FID) 161 which is an ID which may be read by the controller of the flash memory unit 120 (the controller in the flash memory unit 121 illustrated in FIG. 2).

In Step S11, the information processing apparatus (host) 200 generates a verification value where two IDs of the controller ID (CID) 151 and the flash memory ID (FID) 161 are applied and records the generated verification value on the memory card 100. This is a verification value 181 illustrated in the figure.

In addition, as a verification value, for example, the MAC (Message Authentication Code), the token as the signature data where a specific signature key is applied, and the like may be used. The details of the process are described later.

In addition, in Step S12, the information processing apparatus (host) 200 performs the process of recording the content on the memory card 100. This is content 182 illustrated in the figure. In addition, it is preferable that the content be recorded as encrypted data.

3. First Embodiment of Verification Value Generating/Recording Process Performed During Content Recording Process Next, a first embodiment of a verification value generating/recording process performed during the process of recording the content on the memory card is described with reference to FIG. 4.

The first embodiment is an example of a process of generating one MAC (Message Authentication Code) based on the two IDs of the controller ID (CID) and the flash memory ID (FID) as a verification value and recording the verification value during the process of recording the content on the memory card.

Figure 4:
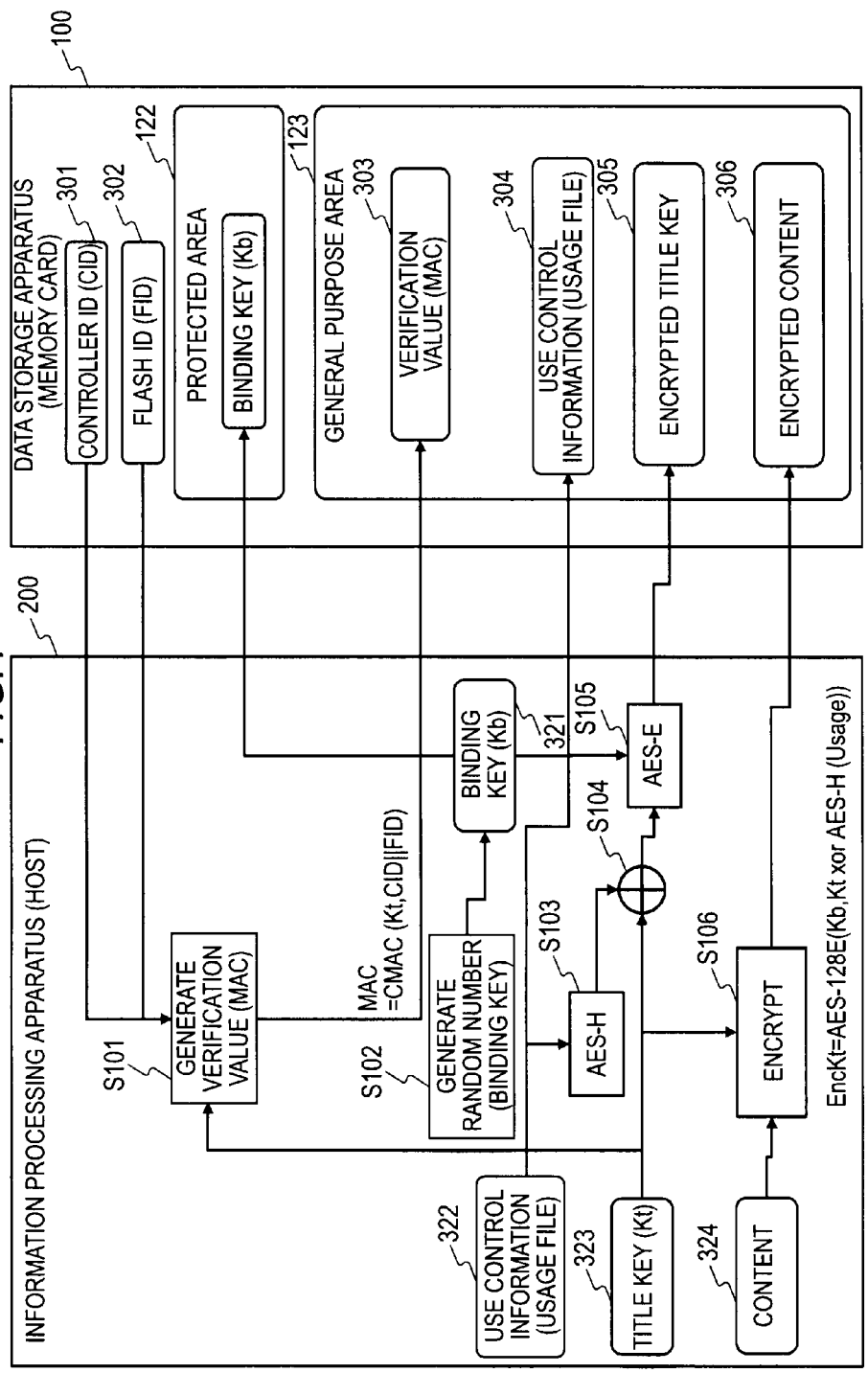
FIG. 4 is a diagram illustrating a first embodiment of a verification value generating/recording process in a content recording process performed by an information processing apparatus according to an embodiment of the present disclosure.

FIG. 4 illustrates a data storage apparatus (memory card) 100 and an information processing apparatus (host) 200 which performs a process of recording the content in the data storage apparatus (memory card) 100.

In addition, the information processing apparatus (host) 200 is, for example, an apparatus such as a PC or a recorder of a user in which the memory card 100 may be installed. Alternatively, the information processing apparatus (host) 200 may be a content provision server or the like, which is connected to a PC of a user or the like through a network.

Two IDs of a controller ID (CID) 301 as a memory card identifier which may be read only by the controller unit of the memory card and a flash ID (FID) 302 which may be read only by the controller in the flash memory of the memory card are recorded on the memory card 100. These IDs are recorded in the non-volatile memory.

The memory card 100 has a protected area 122 where the access is permitted based on a predetermined access right confirmation process and a general purpose area 123 where the access is permitted without performing the access right confirmation process.

First, the information processing apparatus (host) 200 which records the content on the memory card 100 acquires the controller ID (CID) 301 which is an ID which may be read by the controller unit of the memory card 100 and the flash memory ID (FID) 302 which is an ID which may be read by the controller of the flash memory unit (the controller in the flash memory unit 121 illustrated in FIG. 2) from the memory card 100.

In addition, on the condition that the controller ID (CID) 301 is received from the memory card 100, the information processing apparatus (host) 200 performs a mutual authentication process, which is regulated in advance, between the information processing apparatus (host) 200 and the controller unit in the memory card and performs a process of checking whether or not the authentication process is satisfied, and the two apparatuses trust each other. In other words, the information processing apparatus (host) 200 receives the controller ID (CID) 301 from the controller unit of the memory card 100 on the condition that the mutual authentication is satisfied.

In the acquisition process of the flash memory ID (FID) 302, it is necessary to read the flash memory ID by the controller in the flash memory 121 described with reference to FIG. 2. The information processing apparatus (host) 200 outputs a request for reading the flash memory ID to the controller in the flash memory 121 through the controller unit of the memory card 100. The flash memory ID read by the controller in the flash memory 121 is acquired through the authenticated controller unit. In this case, the controller unit of the memory card 100 is only a waypoint for the communication process.

In addition, any one of the configuration where the controller in the flash memory unit 121 is set to have an authentication function and the configuration where the controller in the flash memory unit 121 is set not to have the authentication function may be employed. In the case where the controller in the flash memory unit 121 does not have the authentication function, an authentication process is not performed between the information processing apparatus (host) 200 and the controller in the flash memory unit 121. In the case where the controller in the flash memory unit 121 has the authentication function, a mutual authentication process which is regulated in advance is performed between the information processing apparatus (host) 200 and the controller in the flash memory unit 121, and the flash memory ID (FID) 302 is received from the memory card 100 on the condition that the mutual authentication is satisfied.

In Step S101, the information processing apparatus (host) 200 generates the MAC (Message Authentication Code) as a verification value based on the controller ID (CID) 301 and the flash memory ID (FID) 302 acquired from the memory card 100.

Herein, CMAC which is a MAC generation algorithm is applied to generate the verification value according to the following equation.

$$MAC = CMAC(Kt, CID \| FID)$$

In addition, in the above equation, the terminology is as follows.

Kt is a title key which is a key applied to the content encryption which is stored on the memory card 100.

CID∥FID denotes connection data of the controller ID (CID) and the flash ID (FID).

CMAC(Kt,CID∥FID) denotes an encryption process (MAC generating process) where a CMAC algorithm applied with the title key (Kt) is applied to the connection data of the controller ID (CID) and the flash ID (FID).

The verification value (MAC) which is generated in Step S101 by the information processing apparatus (host) 200 is stored in the general purpose area 123 of the data storage apparatus (memory card) 100. This is a verification value (MAC) 303 illustrated in FIG. 4.

Next, in Step S102, the information processing apparatus (host) 200 generates a binding key (Kb) 321 through a random number generating process.

The binding key (Kb) 321 is generated as a key which is applied to the encryption process of the title key (Kt) 323 which is applied to the content encryption.

In addition, the generated binding key (Kb) is stored in the protected area 122 of the memory card 100. During the process of recording the binding key (Kb) in the protected area, the confirmation process of the access right to the protected area 122 of the information processing apparatus (host) 200 is performed in the controller unit of the memory card 100.

For example, the controller unit of the memory card 100 acquires a certificate (Cert) such as a public key certificate retained by the information processing apparatus (host) 200 and performs the confirmation process of the access right to the protected area 122 of the information processing apparatus (host) 200 according to the information recorded in the certificate (Cert).

The writing of the binding key (Kb) is performed on the condition that the access right to the protected area 122 of the information processing apparatus (host) 200 is verified.

In the case where the access right to the protected area 122 of the information processing apparatus (host) 200 is not verified, the writing of the binding key (Kb) is not performed, and thereafter, the content recording process is also not performed.

After the access right to the protected area 122 of the information processing apparatus (host) 200 is verified and the writing of the binding key (Kb) is completed, the information processing apparatus (host) 200 performs a process of encrypting of the title key which is applied to the content encryption and performs a writing process with respect to the memory card. These processes are the processes of Steps S103 to S105 illustrated in FIG. 4.

First, in Step S103, the Hash value calculation (AES-H) of the use control information (Usage file) 322 is performed. The use control information (Usage file) 322 is a use control information file corresponding to the content 324 which is to be recorded on the memory card 100. For example, the use control information (Usage file) 322 is a file recording a content usage rule such as a content copying allowance number.

In Step S103, the Hash value calculation (AES-H) of the use control information (Usage file) 322 is performed, and in Step S104, the Exclusive OR operation process to the title key (Kt) 323 is performed.

In addition, in Step S105, the encryption process (AES-E) applied with the binding key (Kb) 321 is performed with respect to a result of the Exclusive OR operation, so that the encrypted title key is generated, and the encrypted title key is recorded in the general purpose area 123 of the memory card 100. This is an encrypted title key 305 illustrated in FIG. 4. In addition, the use control information is also recorded in the general purpose area 123 of the memory card 100. This is use control information (Usage file) 304 illustrated in FIG. 4.

Generation of an encrypted title key (EncKt) in Step S105 is performed according to, for example, the following equation.

$$EncKt = AES\text{-}128E(Kb, KtxorAES\text{-}H(Usage))$$

In the above equation, KtxorAES-H (Usage) denotes Exclusive OR operation (xor) of the Hash value of the use control information (Usage file) and the title key (Kt).

An encryption process where an encryption algorithm (AES-128E) applied with a binding key (Kb) is performed with respect to a result of the Exclusive OR operation, so that the encrypted title key (EncKt) is generated.

Next, in Step S106, the information processing apparatus (host) 200 performs the encryption process applied with the title key (Kt) 323 with respect to the content 324 and records the encrypted content in the general purpose area 123 of the memory card 100. This is an encrypted content (Encrypted Content) 306 illustrated in FIG. 4.

In this manner, during the recording of the encrypted content 306 on the memory card 100, the information processing apparatus (host) 200 generates the MAC as a verification value 303 corresponding to the encrypted content 306 based on the two IDs of the controller ID (CID) and the flash ID (FID) and records the MAC on the memory card 100.

The reproducing apparatus which reads and reproduces the encrypted content 306 stored on the memory card 100 performs the verification process based on the verification value 303.

In other words, the reproducing apparatus performs the verification process based on the verification value 303 as the process before the reading of the content. Only in the case where the verification is satisfied, the reading and reproducing of the content are performed. In the case where the verification is not satisfied, the reading and reproducing of the content are not permitted. In addition, the detailed sequence of the content reproducing process is described later.

Modified Example of First Embodiment

Next, a modified example of the first embodiment of the verification value generating/recording process performed during the process of recording the content on the memory card described with reference to FIG. 4 is described with reference to FIG. 5.

Figure 5:
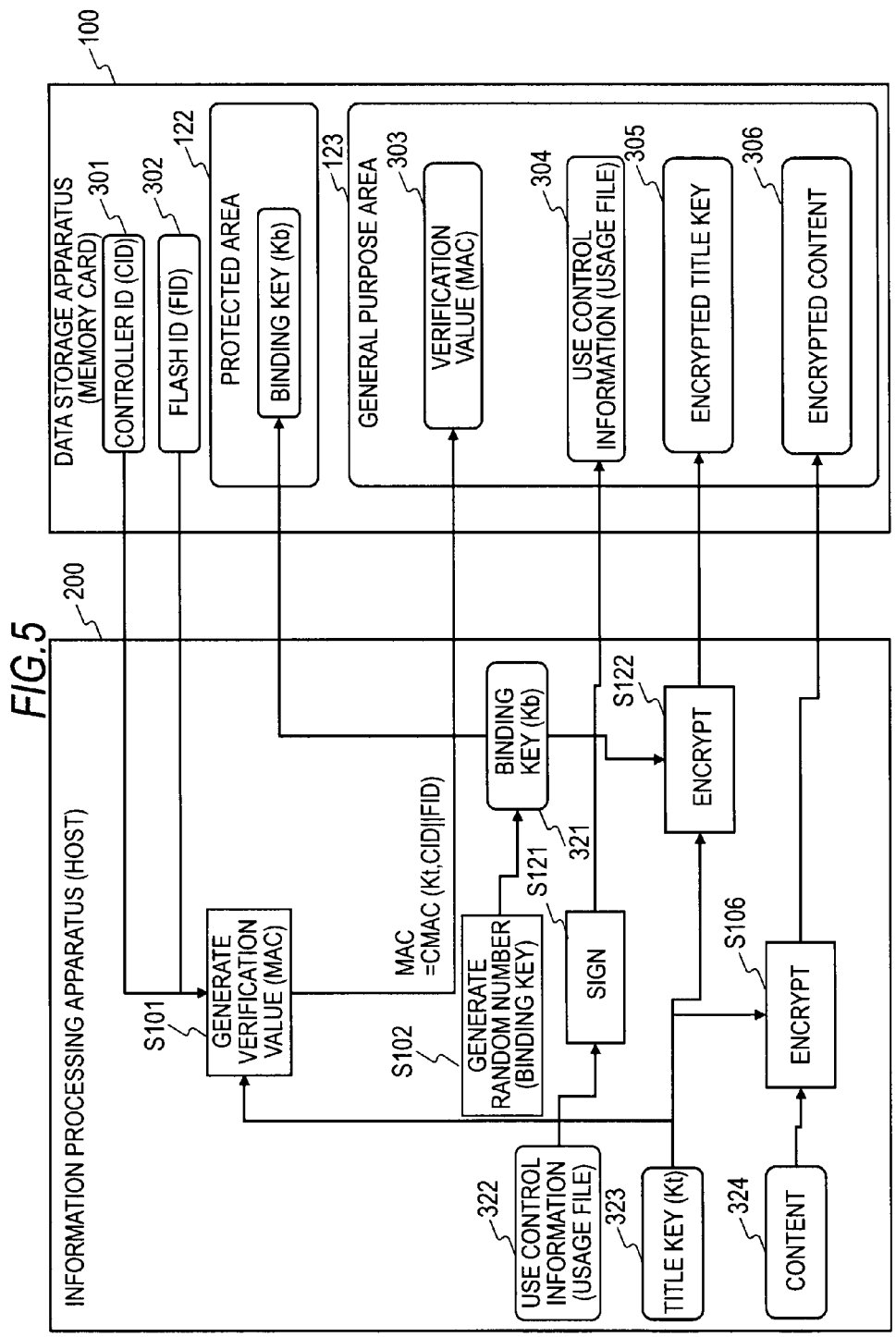
FIG. 5 is a diagram illustrating a modified example of the first embodiment of the verification value generating/recording process in the content recording process performed by the information processing apparatus according to the embodiment of the present disclosure.

Similarly to the process described with reference to FIG. 4, the example of the process illustrated in FIG. 5 is the example of the process of generating one MAC (Message Authentication Code) based on the two IDs of the controller ID (CID) and the flash memory ID (FID) as a verification value and recording the verification value during the process of recording the content on the memory card.

The example of the process illustrated in FIG. 5 is different from the process described with reference to FIG. 4 in that the processes of Steps S103 to S105 among Steps S101 to S106 illustrated in FIG. 4 is replaced with the processes of Steps S121 to S122.

In the process illustrated in FIG. 5, in Step S121, a signature process is performed based on a secret key with respect to use control information (Usage file) 322 to generate signature-attached use control information (Usage file).

The signature-attached use control information is recorded in the general purpose area 123 of the memory card 100. This is use control information (Usage file) 304 illustrated in FIG. 5.

In addition, Step S122, the encryption process applied with the binding key (Kb) 321 is performed with respect to the title key 323, so that the encrypted title key is generated, and the encrypted title key is recorded in the general purpose area 123 of the memory card 100. This is an encrypted title key 305 illustrated in FIG. 5.

The process of the following Step S106 is the same as the process described with reference to FIG. 4, and in Step S106, the encryption process applied with the title key (Kt) 323 is performed with respect to the content 324, and the encrypted content is recorded in the general purpose area 123 of the memory card 100. This is an encrypted content (Encrypted Content) 306 illustrated in FIG. 4.

According to the example of the process, it is configured that the signature is set to the use control information to be recorded, so that it is possible to obtain an effect of preventing falsified verification of the use control information.

4. Second Embodiment of Verification Value Generating/Recording Process Performed During Content Recording Process Next, a second embodiment of a verification value generating/recording process performed during the process of recording the content on the memory card is described with reference to FIG. 6.

The second embodiment is an example of a process of generating separate MACs (Message Authentication Code) based on the two IDs of the controller ID (CID) and the flash memory ID (FID) as verification values and recording the verification values during the process of recording the content on the memory card.

Figure 6:
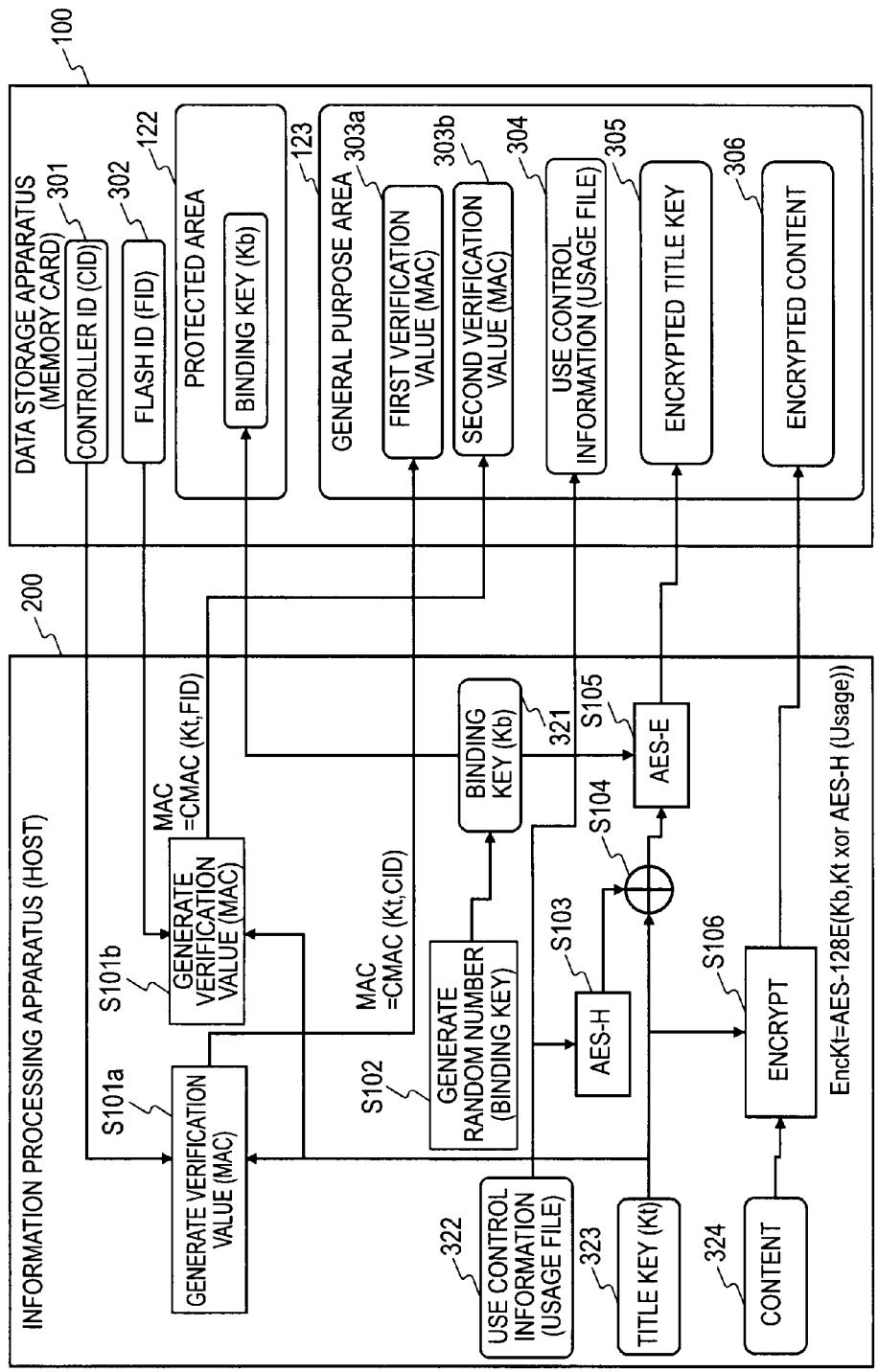
FIG. 6 is a diagram illustrating a second embodiment of the verification value generating/recording process in the content recording process performed by the information processing apparatus according to the embodiment of the present disclosure.

Similarly to FIG. 4, FIG. 6 illustrates a data storage apparatus (memory card) 100 and an information processing apparatus (host) 200 which performs the process of recording the content in the data storage apparatus (memory card) 100.

In addition, the information processing apparatus (host) 200 is, for example, an apparatus such as a PC or a recorder of a user in which the memory card 100 may be installed. Alternatively, the information processing apparatus (host) 200 may be a content provision server or the like, which is connected to a PC of a user or the like through a network.

Two IDs of the controller ID (CID) 301 as a memory card identifier which may be read only by the controller unit of the memory card and the flash ID (FID) 302 as a memory card identifier which may be read only by the controller in the flash memory of the memory card are recorded on the memory card 100. These IDs are recorded in the non-volatile memory.

The process sequence illustrated in FIG. 6 is different from the process sequence illustrated in FIG. 4 in that the process of Step S101 in FIG. 4 is set as two processes of Step S101a and Step S101b in FIG. 6. In the two steps, the following two verification values are separately generated.

(a) a first verification value based on the controller ID (CID) (MAC)

(b) a second verification value based on the flash ID (FID) (MAC)

The two verification values are recorded in the general purpose area 123 of the memory card 100.

Other processes are the same as the processes described with reference to FIG. 4.

First, in Step S101a, the information processing apparatus (host) 200 generates the MAC (Message Authentication Code) as the first verification value based on the controller ID (CID) 301 read from the memory card 100.

Herein, CMAC which is a MAC generation algorithm is applied to generate the first verification value based on the controller ID (CID) according to the following equation.

$$MAC = CMAC(Kt, CID)$$

The first verification value (MAC) generated in Step S101a by the information processing apparatus (host) 200 is stored in the general purpose area 123 of the data storage apparatus (memory card) 100. This is a first verification value (MAC) 303a illustrated in FIG. 6.

In addition, in Step S101b, the information processing apparatus (host) 200 generates the MAC (Message Authentication Code) as the second verification value based on the flash ID (FID) 302 read from the memory card 100.

Similarly to the process with respect to the CID, CMAC which is a MAC generation algorithm is applied to generate the second verification value based on the flash ID (FID) according to the following equation.

$$MAC = CMAC(Kt, FID)$$

The second verification value (MAC) generated in Step S101b by the information processing apparatus (host) 200 is stored in the general purpose area 123 of the data storage apparatus (memory card) 100. This is a second verification value (MAC) 303b illustrated in FIG. 6.

The process of Step S102 to Step S106 is the same process as that of the first embodiment described with reference to FIG. 4.

In the example of the process, during the recording of the encrypted content 306 on the memory card 100, the information processing apparatus (host) 200 separately generates the following two verification values as a verification value 303 corresponding to the encrypted content 306.

(a) a first verification value based on the controller ID (CID) (MAC)

(b) a second verification value based on the flash ID (FID) (MAC)

The information processing apparatus (host) 200 records the two verification values on the memory card 100.

The reproducing apparatus which reads and reproduces the encrypted content 306 stored on the memory card 100 performs the verification process based on the two verification values of the first verification value 303a and the second verification value 303b.

In other words, the reproducing apparatus performs the verification process based on the first verification value 303a and the second verification value 303b as the process before the reading of the content. Only in the case where the verification is satisfied, is the reading and reproducing of the content performed. In the case where the verification is not satisfied, the reading and reproducing of the content are not permitted. In addition, the detailed sequence of the content reproducing process is described later.

In addition, an example of the process may be configured so that, first, the same process as that of Steps S121 to S122 described with reference to FIG. 5 is applied so as to set the signature with respect to the use control information and to perform the recording.

5. Third Embodiment of Verification Value Generating/Recording Process Performed During Content Recording Process Next, a third embodiment of a verification value generating/recording process performed during the process of recording the content on the memory card is described with reference to FIG. 7.

The third embodiment is an example of a process of generating signature data applied with the signature key (Ksign) based on the two IDs of the controller ID (CID) and the flash memory ID (FID) as a verification value (token) and recording the verification value during the process of recording the content on the memory card.

Figure 7:
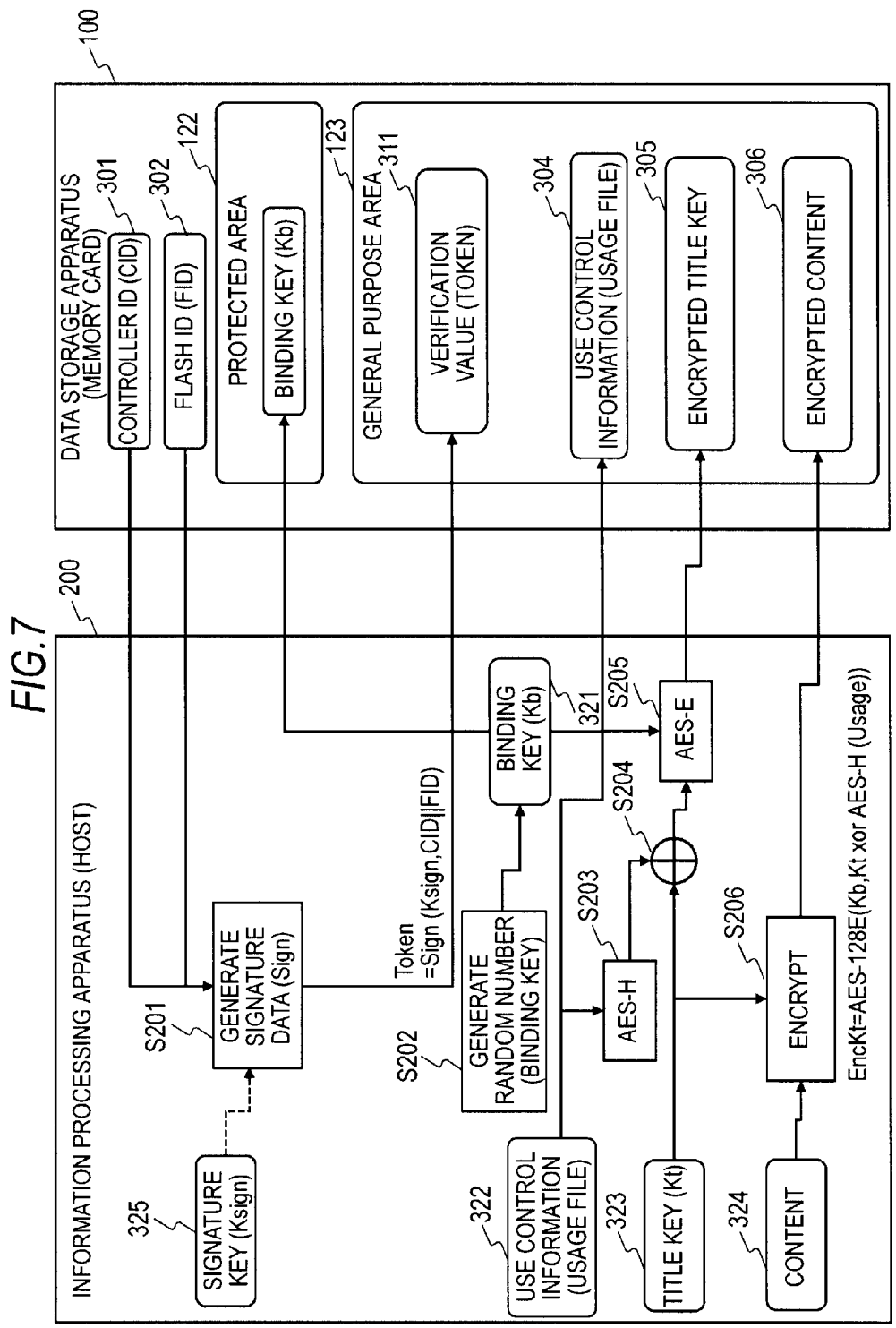
FIG. 7 is a diagram illustrating a third embodiment of the verification value generating/recording process in the content recording process performed by the information processing apparatus according to the embodiment of the present disclosure.

Similarly FIGS. 4 and 6, FIG. 7 illustrates a data storage apparatus (memory card) 100 and an information processing apparatus (host) 200 which performs the process of recording the content in the data storage apparatus (memory card) 100.

In addition, the information processing apparatus (host) 200 is, for example, an apparatus such as a PC or a recorder of a user in which the memory card 100 may be installed. Alternatively, the information processing apparatus (host) 200 may be a content provision server or the like, which is connected to a PC of a user or the like through a network.

Two IDs of a controller ID (CID) 301 as a memory card identifier which may be read only by the controller unit of the memory card and a flash ID (FID) 302 which may be read only by the controller in the flash memory of the memory card are recorded on the memory card 100. These IDs are recorded in the non-volatile memory.

The process sequence illustrated in FIG. 7 is different from the process sequence illustrated in FIG. 4 in that the process of Step S101 in FIG. 4 is replaced with a signature data (sign) generating process of Step S201 in FIG. 7.

First, in Step S201, the information processing apparatus (host) 200 generates signature data applied with a signature key (Ksign) retained by the information processing apparatus (host) 200 with respect to the controller ID (CID) 301 read from the memory card 100 and the flash ID (FID) 302. For example, the signature data generating process using a secret key according to a public key encryption scheme as the signature key is performed.

The token as the signature data is generated according to, for example, the following equation.

Token=Sign(Ksign,CID∥FID)

In addition, in the above equation, the terminology is as follows.

Ksign is a signature key.

CID∥FID denotes connection data of the controller ID (CID) and the flash ID (FID).

Sign(Ksign,CID∥FID) denotes a signature process where a signature algorithm (Sign) applied with the signature key (Ksign) is applied to the connection data of the controller ID (CID) and the flash ID (FID).

The token as a verification value generated in Step S201 by the information processing apparatus (host) 200 is stored in the general purpose area 123 of the data storage apparatus (memory card) 100. This is a verification value (token) 311 illustrated in FIG. 7.

The process of Step S202 to Step S206 is the same process as that of the process Step S102 to Step S106 of the first embodiment described with reference to FIG. 4.

In the example of the process, during the recording of the encrypted content 306 on the memory card 100, the information processing apparatus (host) 200 generates the signature data (token), to which the signature key (Ksign) retained by the information processing apparatus (host) 200 is applied, as a verification value 311 corresponding to the encrypted content 306 and records the token on the memory card 100.

The reproducing apparatus which reads and reproduces the encrypted content 306 stored on the memory card 100 performs the verification process based on the verification value 311.

In other words, the reproducing apparatus performs the verification process based on the verification value 311 as the process before the reading of the content. Only in the case where the verification is satisfied, the reading and reproducing of the content are performed. In the case where the verification is not satisfied, the reading and reproducing of the content are not permitted. In addition, the detailed sequence of the content reproducing process is described later.

In addition, the example of the process may be configured so that, first, the same process as that of Steps S121 to S122 described with reference to FIG. 5 is applied so as to set the signature with respect to the use control information and to perform the recording.

6. Fourth Embodiment of Verification Value Generating/Recording Process Performed During Content Recording Process Next, a fourth embodiment of a verification value generating/recording process performed during the process of recording the content on the memory card is described with reference to FIG. 8.

The fourth embodiment is an example of a process of separately generating signature data applied with signature keys (Ksign) based on the two IDs of the controller ID (CID) and the flash memory ID (FID) as the two verification values (token) during the process of recording the content on the memory card and recording the two verification values (token).

Similarly to FIGS. 4 to 7, FIG. 8 illustrates a data storage apparatus (memory card) 100 and an information processing apparatus (host) 200 which performs a process of recording the content in the data storage apparatus (memory card) 100.

In addition, the information processing apparatus (host) 200 is, for example, an apparatus such as a PC or a recorder of a user in which the memory card 100 may be installed. Alternatively, the information processing apparatus (host) 200 may be a content provision server or the like, which is connected to a PC of a user or the like through a network.

Two IDs of a controller ID (CID) 301 as a memory card identifier which may be read only by the controller unit of the memory card and a flash ID (FID) 302 which may be read only by the controller in the flash memory of the memory card are recorded on the memory card 100. These IDs are recorded in the non-volatile memory.

Figure 8:
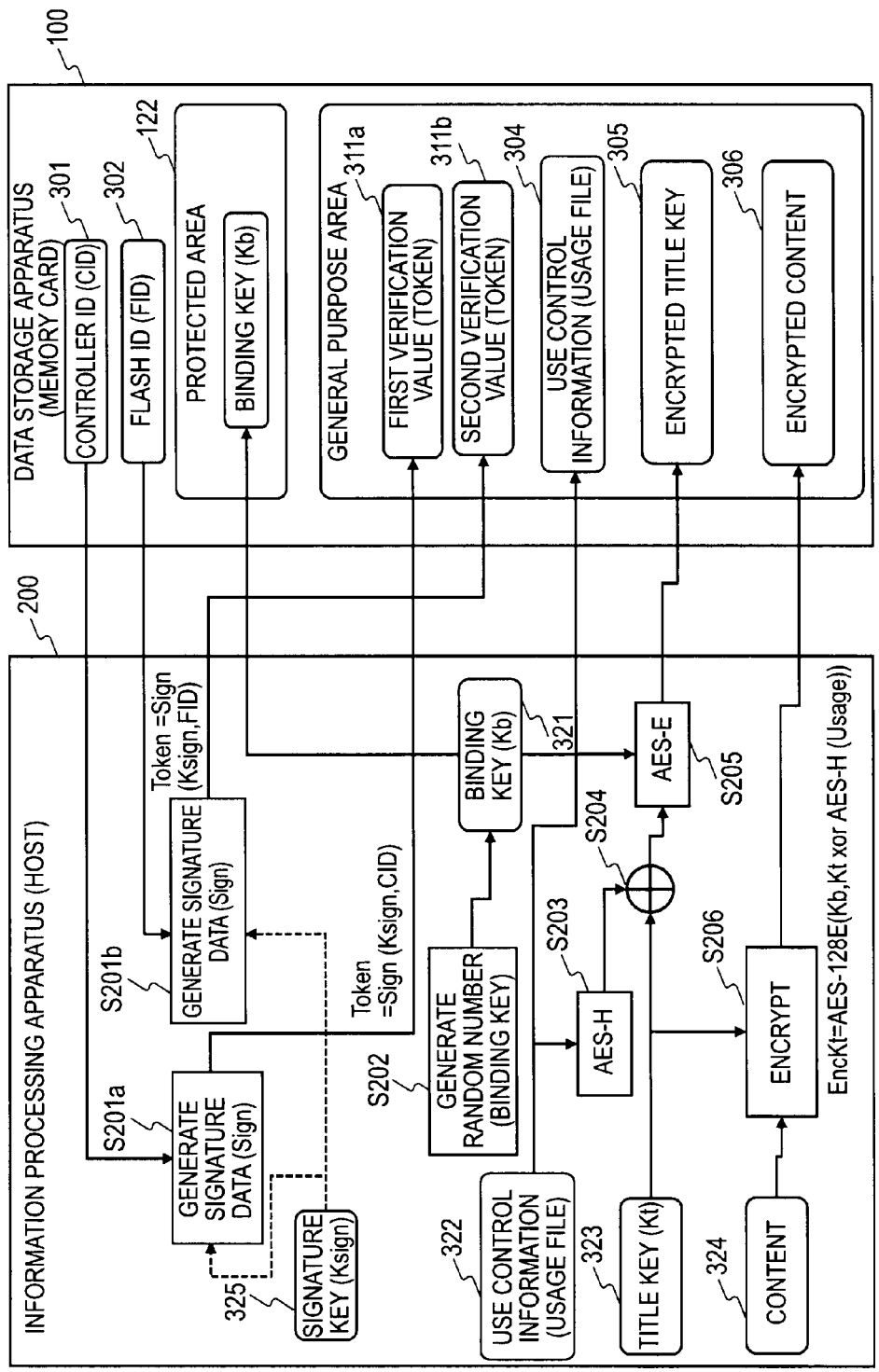
FIG. 8 is a diagram illustrating a fourth embodiment of the verification value generating/recording process in the content recording process performed by the information processing apparatus according to the embodiment of the present disclosure.

The process sequence illustrated in FIG. 8 is different from the process sequence illustrated in FIG. 7 in that the process of Step S201 in FIG. 7 is set as two processes of Step S201a and Step S201b in FIG. 8. In the two steps, the following two verification values are separately generated.

(a) a first verification value based on the controller ID (CID) (token)

(b) a second verification value based on the flash ID (FID) (token)

The two verification values are recorded in the general purpose area 123 of the memory card 100.

Other processes are the same as the processes described with reference to FIG. 7.

First, in Step S201a, the information processing apparatus (host) 200 generates the signature data where the signature key (Ksign) is applied to the controller ID (CID) 301 read from the memory card 100 as the first verification value (Token).

The token as the signature data is generated according to, for example, the following equation.

Token=Sign(Ksign,CID)

In addition, in the above equation, the terminology is as follows.

Ksign is a signature key.

Sign(Ksign,CID) denotes a signature process where a signature algorithm (Sign) applied with the signature key (Ksign) is applied to the controller ID (CID).

The first verification value (token) which is generated in Step S201a by the information processing apparatus (host) 200 is stored in the general purpose area 123 of the data storage apparatus (memory card) 100. This is a first verification value (token) 311a illustrated in FIG. 8.

In addition, in Step S201b, the information processing apparatus (host) 200 generates the signature data, where the signature key (Ksign) is applied to the flash ID (FID) 302 read from the memory card 100, as a second verification value (Token).

The token as the signature data is generated according to, for example, the following equation.

Token=Sign(Ksign,FID)

In addition, in the above equation, the terminology is as follows.

Ksign is a signature key.

Sign(Ksign,FID) denotes a signature process where a signature algorithm (Sign) applied with the signature key (Ksign) is applied to the flash ID (FID).

The second verification value (token) generated in Step S201b by the information processing apparatus (host) 200 is stored in the general purpose area 123 of the data storage apparatus (memory card) 100. This is a second verification value (token) 311b illustrated in FIG. 8.

The process of Step S202 to Step S206 is the same process as that of the process Step S102 to S106 of the first embodiment described with reference to FIG. 4.

In the example of the process, during the recording of the encrypted content 306 on the memory card 100, the information processing apparatus (host) 200 separately generates the following two verification values as a verification value 303 corresponding to the encrypted content 306.

(a) a first verification value based on the controller ID (CID) (token)

(b) a second verification value based on the flash ID (FID) (token)

The information processing apparatus (host) 200 records the two verification values on the memory card 100.

The reproducing apparatus which reads and reproduces the encrypted content 306 stored on the memory card 100 performs the verification process based on the two verification values of the first verification value 311a and the second verification value 311b.

In other words, the reproducing apparatus performs the verification process based on the first verification value 311a and the second verification value 311b as the process before the reading of the content. Only in the case where the verification is satisfied, the reading and reproducing of the content are performed. In the case where the verification is not satisfied, the reading and reproducing of the content are not permitted. In addition, the detailed sequence of the content reproducing process is described later.

In addition, the example of the process may be configured so that, first, the same process as that of Steps S121 to S122 described with reference to FIG. 5 is applied so as to set the signature with respect to the use control information and to perform the recording.

7. Content Reproducing Process Sequence

Next, a process sequence in the process of reproducing the content recorded on the memory card is described with reference to a flowchart illustrated in FIG. 9.

Figure 9:
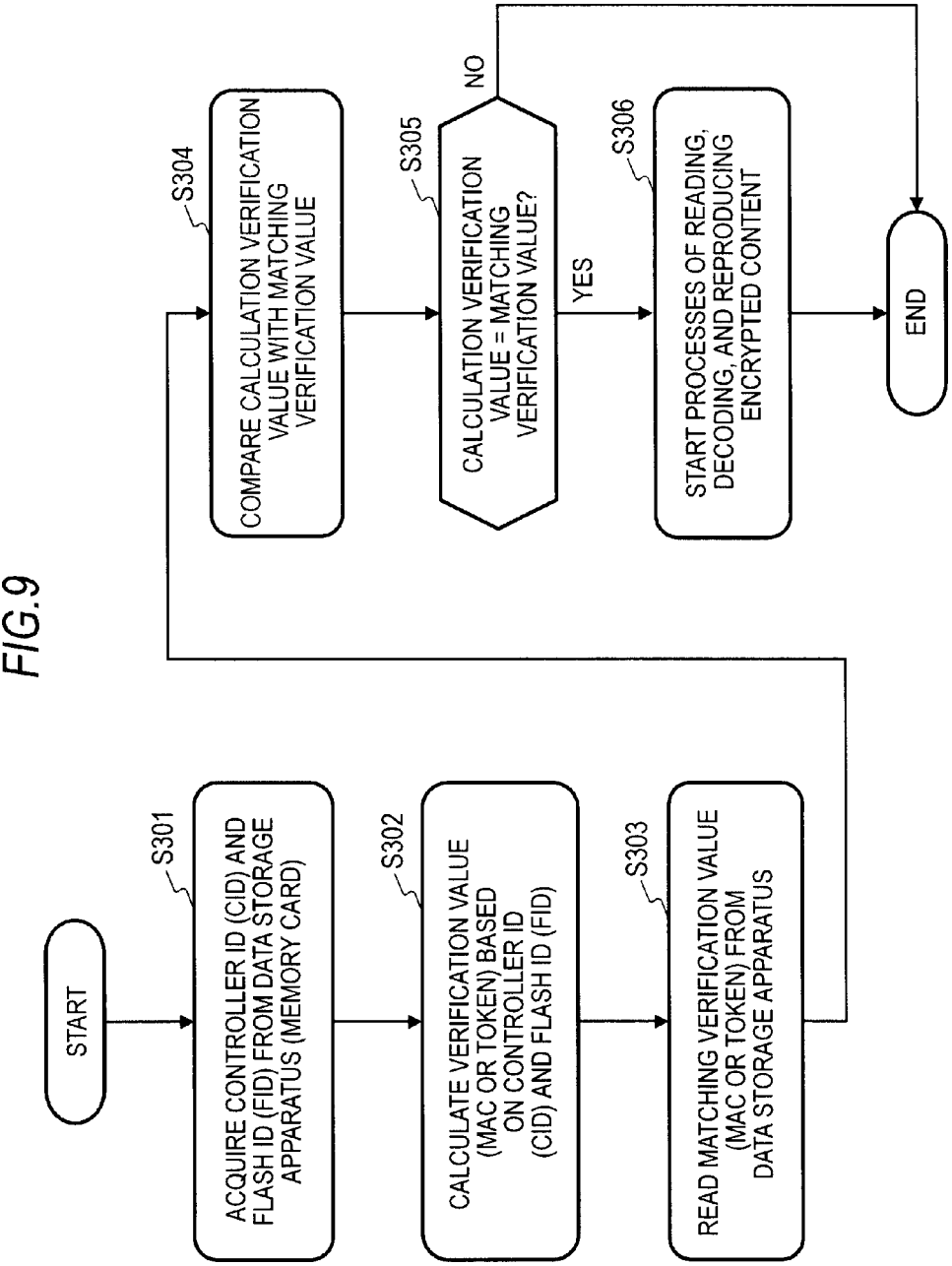
FIG. 9 is a flowchart illustrating a sequence of a content reproducing process performed by the information processing apparatus according to the embodiment of the present disclosure.

The reproducing process sequence illustrated in FIG. 9 is a process sequence which is performed in the reproducing apparatus where the memory card which stores any one of the verification values described above with reference to FIGS. 4 to 8 and the content is installed.

First, in Step S301, the reproducing apparatus performs a process of reading the controller ID (CID) and the flash ID (FID) from the data storage apparatus (memory card).

In addition, the reproducing apparatus is preferably configured so that, before the reproducing apparatus reads the controller ID (CID) from the memory card, the reproducing apparatus performs mutual authentication between the reproducing apparatus and the controller unit of the memory card and reads the controller ID on the condition that the mutual authentication is satisfied.

Similarly, the reproducing apparatus is preferably configured so that, before the reproducing apparatus reads the flash ID (FID) the memory card, the reproducing apparatus performs mutual authentication between the reproducing apparatus and the controller in the flash memory unit of the memory card and reads the flash ID on the condition that the mutual authentication is satisfied.

Next, in Step S302, the reproducing apparatus calculates verification values which the controller ID (CID) and the flash ID (FID) read from the memory card are applied to.

Herein, the calculation verification values are the several verification values of the first to fourth embodiments described above with reference to FIGS. 4 to 8. More specifically, these are the several verification values as follows.

(1) MAC based on the connection data of the CID and the FID (corresponding to the first embodiment (FIGS. 4 and 5)

(2) Two MACs based on the separate data of the CID and the FID (corresponding to the second embodiment (FIG. 6))

(3) Signature data (token) based on the connection data of the CID and the FID (corresponding to the third embodiment (FIG. 7))

(4) Two signature data (token) based on the separate data of the CID and the FID (corresponding to the fourth embodiment (FIG. 8))

Next, in Step S303, the reproducing apparatus reads matching verification values from the memory card. These are the several verification values described above with reference to FIGS. 4 to 8. More specifically, these are the several verification values as follows.

(1) In the case of the configuration of the first embodiment illustrated in FIGS. 4 and 5, this is the verification value (MAC) 303.

(2) In the case of the configuration of the second embodiment illustrated in FIG. 6, these are the first verification value (MAC) 303a and the second verification value (MAC) 303b.

(3) In the case of the configuration of the third embodiment illustrated in FIG. 7, this is the verification value (token) 311.

(4) In the case of the configuration of the fourth embodiment illustrated in FIG. 8, these are the first verification value (token) 311a and the second verification value (token) 311b.

Next, in Step S304, the reproducing apparatus compares the calculation verification value calculated in Step S302 with the matching verification value read from the memory card in Step S303.

In Step S305, it is determined whether or not the following equation is satisfied.

(Calculation Verification Value)=(Matching Verification Value)

In the case where the above equation is satisfied, the verification is determined to be successful, and the process proceeds to Step S306, so that the encrypted content is read from the memory card and the process of decoding and reproducing the encrypted content is performed.

On the other hand, in the case where the above equation is not satisfied, the verification is determined to fail and the process is ended without performing the content reproducing process of Step S306. In this case, the reproducing of the content reproducing is not permitted.

In this manner, in the configuration of the embodiment of the present disclosure, the controller ID (CID) which is managed by the controller unit in the memory card and is capable of being read under the management of the controller unit and the flash ID (FID) which is managed by the flash memory unit and is capable of being read under the management of the controller in the flash memory unit are configured to be recorded on the memory card.

In the configuration, as the time of the process of recording the content, the verification values are generated based on the two IDs of the controller ID (CID) and the flash ID (FID) and the verification values together with the content is recorded; and during the process of reproducing the content, the verification values based on the two IDs of the controller ID (CID) and the flash ID (FID) are calculated and the verification process of matching the verification values, so that the reproducing of the content is permitted on the condition that the verification is satisfied.

According to this configuration, although any one of a controller vendor as a manufacturer of the controller unit and a flash memory vendor as a manufacturer of the flash memory unit performs improper ID setting, if any one thereof performs proper ID management, it is possible to prevent unauthorized use of the content.

8. Example of Hardware Configuration of Each Apparatus

Figure 10:
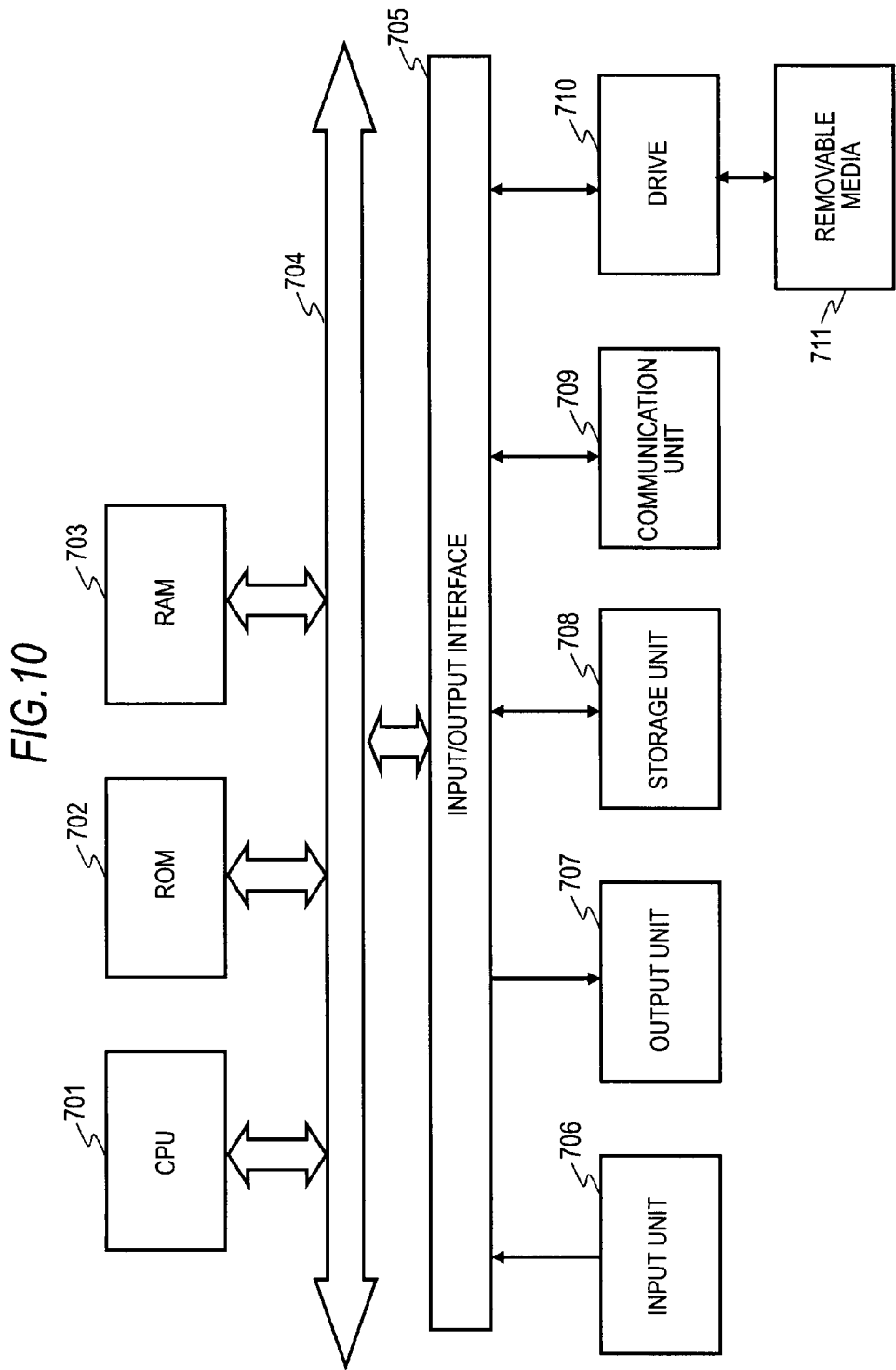
FIG. 10 is a diagram illustrating an example of a hardware configuration of an information processing apparatus.

Finally, an example of a hardware configuration of each apparatus which performs the aforementioned processes is described with reference to FIG. 10 and the following figures.

First, an example of a hardware configuration of an information recording apparatus or an information reproducing apparatus which performs the content recording process or reproducing process with respect to the memory card is described with reference to FIG. 10.

A CPU (Central Processing Unit) 701 functions as a data processing unit which performs various processes according to programs stored in a ROM (Read Only Memory) 702 or a storage unit 708. For example, the recording process with respect to the memory cards (removable media 711 in the figure) described in the aforementioned embodiments, the data reproducing process with respect to the memory card (removable media 711 in the figure), and the like are performed. A RAM (Random Access Memory) 703 appropriately stores programs executed by the CPU 701, data, and the like. The CPU 701, the ROM 702, and the RAM 703 are connected to each other through a bus 704.

The CPU 701 is connected through the bus 704 to an input/output interface 705, and the input/output interface 705 is connected to an input unit 706 which is constructed with various switches, a keyboard, a mouse, a microphone, and the like and an output unit 707 which is constructed with a display, a speaker, and the like. The CPU 701 performs various processes in response to commands input from the input unit 706 and outputs results of the process to, for example, the output unit 707.

A storage unit 708 which is connected to the input/output interface 705 is constructed with, for example, a hard disk and the like to store the programs executed by the CPU 701 or various data. A communication unit 709 communicates with an external apparatus via a network such as the Internet or a local area network.

A drive 710 which is connected to the input/output interface 705 drives removable media 711 such as a magnetic disk, an optical disc, a magneto-optical disc, or a semiconductor memory to acquire the recorded content, key information, various data of programs, or the like. For example, data processing according to the acquired program, data processing executed by the CPU using the content or the key data, key generation, content encryption, and recording process, and decoding and reproducing process according to a recording/reproducing program, and the like are performed.

Figure 11:
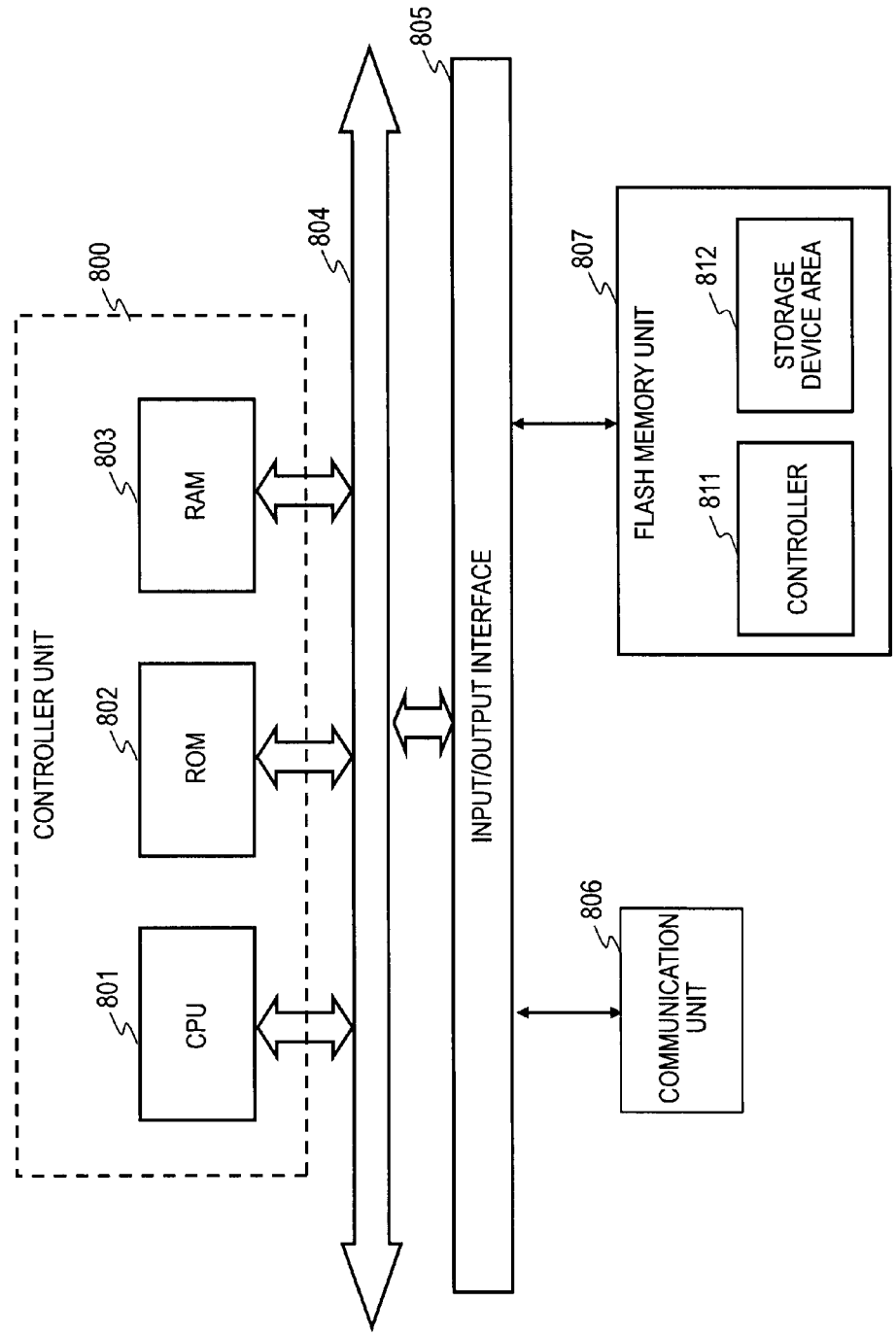
FIG. 11 is a diagram illustrating an example of a hardware configuration of a memory card.

FIG. 11 illustrates an example of a hardware configuration of a memory card.

First, as described with reference to FIG. 2, the memory card includes a controller unit 800 and a flash memory unit 807. The data storage apparatus (memory card) 100 is configured with for example, an SD card, a USB memory, a Memory Stick (registered trademark), or the like.

The controller unit 800 includes a CPU 801, a ROM 802, and a RAM 803.

The CPU (Central Processing Unit) 801 performs various processes according to programs stored in the ROM (Read Only Memory) 802 or the flash memory unit 807.

For example, the controller unit 800 reads the aforementioned controller ID (CID). In addition, the controller ID (CID) may be set so as to be recorded in the memory in the controller unit 800, or the controller ID (CID) may be set so as to be recorded in the storage device area 812 of the flash memory unit 807.

In addition, the controller unit 800 performs a communication process with respect to a server and a host apparatus such as a recording apparatus or a reproducing apparatus, a data writing reading process with respect to the flash memory unit 807, an access permission determination process with respect to the flash memory unit 807 in units of a partitioned area of the protected area, and the like. The RAM (Random Access Memory) 803 appropriately stores programs executed by the CPU 801, data, and the like. The CPU 801, the ROM 802, and the RAM 803 are connected to each other through a bus 804.

The CPU 801 is connected through the bus 804 to an input/output interface 805, and the input/output interface 805 is connected to a communication unit 806 and a flash memory unit 807. The communication unit 806 which is connected to the input/output interface 805 communicates with, for example, the server and the host apparatus.

The flash memory unit 807 corresponds to the flash memory unit 120 illustrated in FIG. 2 and has a controller 811 in the flash memory unit and a storage device area 812. The controller 811 performs the reading process of the flash ID (FID). The flash ID (FID) is recorded in, for example, the storage device area 812.

The storage device area 812 is a data storage area and, as described above, includes a protected area where the access is limited and a general purpose area where the data recording and reading may be freely performed.

In addition, in the aforementioned embodiment, although a specific flash memory type of a memory card is exemplarily described, various types of memory such as a USB memory may be adapted to the present disclosure.

Hereinbefore, the present disclosure is described in detail with reference to specific embodiments. However, it is obvious that modifications or changes of the embodiments may be made by the ordinarily skilled in the art within the scope without departing from the spirit of the present disclosure. In other words, since the present disclosure is disclosed as exemplary forms, the present disclosure is not to be analyzed in limitative meaning. The determination of the spirit of the present disclosure is necessarily referred to the appended claims.

In addition, a series of the processes described in the specification may be performed by a hardware configuration, a software configuration, or a combined configuration thereof. In the case where the processes are performed by software, a program where the process sequence is recorded may be installed in a memory in a computer assembled with dedicated hardware to be performed, or the program may be installed in a general purpose computer, which may perform various processes, to be performed. For example, the program may be recorded in a recording medium in advance. Besides the configuration where the program is installed from the recording medium to the computer, the program may be received through a network such as a LAN (Local Area Network) or the Internet and installed in a built-in recording medium such as a hard disk.

In addition, various processes described in the specification may be performed not only in a time sequence according to the embodiment of the present disclosure but also in parallel or separately according to the processing capacity of the apparatus which performs the processes or according to necessity. In addition, in the specification, a system denotes a configuration of a logical set of a plurality of apparatuses, and it is not limited to a configuration where the component apparatuses are included in the same case.

Hereinbefore, as described, according to a configuration of an embodiment of the present disclosure, a configuration of preventing unauthorized use of the content using the verification value based on the ID is implemented. More specifically, the controller ID (CID) which is read by the controller unit and the flash ID (FID) which is read by the controller of the flash memory unit are recorded on the memory card including the flash memory unit which includes a data storage area and a controller and the controller unit which performs data recording and reading control with respect to the flash memory unit. The recording apparatus which performs the content recording process generates the verification value such as MACs using the CID and the FID and records the verification value on the memory card, and the reproducing apparatus which performs the content reproducing performs the verification process of comparing the calculation verification value based on the CID and the FID with the matching verification value and performs the content reproducing on the condition that the verification is satisfied.

According to this configuration, although any one of a controller vendor as a manufacturer of the controller unit and a flash memory vendor as a manufacturer of the flash memory unit performs improper ID setting, if any one thereof performs proper ID management, it is possible to prevent unauthorized use of the content.

It should be understood by those skilled in the art that various modifications, combinations, sub-combinations and alterations may occur depending on design requirements and other factors insofar as they are within the scope of the appended claims or the equivalents thereof.

What is claimed is:

1. An information storage apparatus, comprising:
    a memory unit;
    an interface configured to communicate with an information processing apparatus to which the information storage apparatus is connected;
    a first controller configured to
        read first identification information from the memory unit; and
        control providing the first identification information to the information processing apparatus via the interface; and
    a second controller included in the memory unit configured to
        read second identification information from the memory unit, wherein the second identification information is only read by the second controller; and
        control providing the second identification information to the information processing apparatus via the interface in response to an external instruction received from the information processing apparatus via the interface, wherein
    the first identification information is a controller identification (CID) of the first controller and the second identification information is a flash identification (FID) of the memory unit; and
    the interface receives a verification value from the information processing apparatus, the verification value being a message authentication code (MAC) generated by the information processing apparatus by applying a MAC algorithm according to the following equation:

MAC=CMAC(Kt,CID∥FID),

Kt being a title key which is a key applied to content encryption which is stored in the memory unit,
    CID∥FID being connection data of the controller identification (CID) and the flash identification (FID), and
    CMAC(Kt,CID∥FID) being an encryption process where a CMAC algorithm applied with the title key (Kt) is applied to the connection data of the controller identification (CID) and the flash identification (FID), and
    the second controller is configured to write the verification value into the memory unit.

2. The information storage apparatus of claim 1, wherein the memory unit is a flash memory unit, and the flash identification (FID) is a flash memory identification uniquely associated with the flash memory unit.

3. The information storage apparatus of claim 1, wherein the controller identification (CID) is uniquely associated with the first controller.

4. The information storage apparatus of claim 1, wherein the controller identification (CID) is only read by the first controller.

5. The information storage apparatus of claim 1, wherein the memory unit includes a protected area to which access is permitted based on a predetermined access right confirmation process.

6. The information storage apparatus of claim 1, wherein the memory unit includes a general purpose area to which access is permitted without performing an access right confirmation process.

7. The information storage apparatus of claim 1, wherein the information storage apparatus performs mutual authentication with the information processing apparatus via the interface.

8. The information storage apparatus of claim 7, wherein the second controller controls a process to provide the flash identification (FID) to the information processing apparatus in response to the external instruction via the interface when the authentication is successful.

9. The information storage apparatus of claim 8, wherein the verification value is generated by applying a title key to the controller identification (CID) and the flash identification (FID).

10. The information storage apparatus of claim 9, wherein the memory unit includes a general purpose area to which access is permitted without performing an access right confirmation process, and the verification value is stored to the general purpose area.

11. The information storage apparatus of claim 10, wherein the memory unit includes a protected area to which access is permitted based on a predetermined access right confirmation process, and a binding key received from the information processing apparatus via the interface is stored to the protected area.

12. The information storage apparatus of claim 11, wherein the interface receives an encrypted title key from the information processing apparatus, the encrypted title key generated at the information processing apparatus based on the title key and the binding key.

13. The information storage apparatus of claim 12, wherein the interface receives content encrypted by the title key from the information processing apparatus and stores the encrypted content to the general purpose area.

14. An information storage method performed by an information storage apparatus, the method comprising:
    reading, by a first controller of the information storage apparatus, first identification information from a memory unit of the information storage apparatus;
    outputting, by an interface of the information storage apparatus, the first identification information to an information processing apparatus connected to the information storage apparatus via the interface;

reading, by a second controller included in the memory unit, second identification information from the memory unit, wherein the second identification information is only read by the second controller;

outputting, by the second controller, the second identification information in response to an external instruction received from the information processing apparatus via the interface, wherein the first identification information is a controller identification (CID) of the first controller and the second identification information is a flash identification (FID) of the memory unit; and receiving, via the interface, a verification value from the information processing apparatus, the verification value being a message authentication code (MAC) generated by the information processing apparatus by applying a MAC algorithm according to the following equation:

$$MAC=CMAC(Kt,CID\|FID),$$

Kt being a title key which is a key applied to content encryption which is stored in the memory unit, CID∥FID being connection data of the controller identification (CID) and the flash identification (FID); and CMAC(Kt,CID∥FID) being an encryption process where a CMAC algorithm applied with the title key (Kt) is applied to the connection data of the controller identification (CID) and the flash identification (FID); and writing, by the second controller, the verification value into the memory unit.

15. One or more non-transitory computer readable medium including computer program instructions, which when executed by a first controller and a second controller, cause the first and second controllers to perform a method comprising:

reading, by the first controller, first identification information from a memory unit;

outputting, by the first controller, the first identification information to an information processing apparatus connected to the information storage apparatus via an interface;

reading, by the second controller included in the memory unit, second identification information from the memory unit, wherein the second identification information is only read by the second controller;

outputting, by the second controller, the second identification information in response to an external instruction received from the information processing apparatus via the interface; wherein the first identification information is a controller identification (CID) of the first controller and the second identification information is a flash identification (FID) of the memory unit; and receiving a verification value from the information processing apparatus, the verification value being a message authentication code (MAC) generated by the information processing apparatus by applying a MAC algorithm according to the following equation:

$$MAC=CMAC(Kt,CID\|FID),$$

Kt being a title key which is a key applied to content encryption which is stored in the memory unit, CID∥FID being connection data of the controller identification (CID) and the flash identification (FID), and CMAC(Kt,CID∥FID) being an encryption process where a CMAC algorithm applied with the title key (Kt) is applied to the connection data of the controller identification (CID) and the flash identification (FID); and writing, by the second controller, the verification value into the memory unit.

* * * * *